July 29, 1947.  R. R. WARE, JR  2,424,784
WHEEL STRUCTURE
Filed June 4, 1945
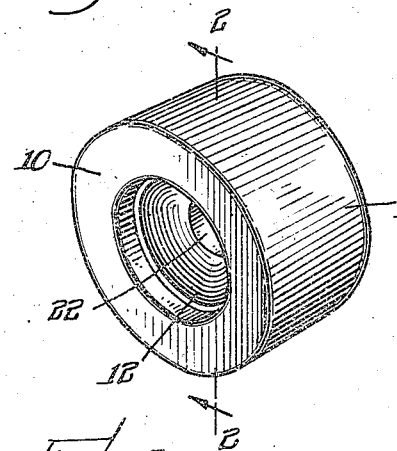
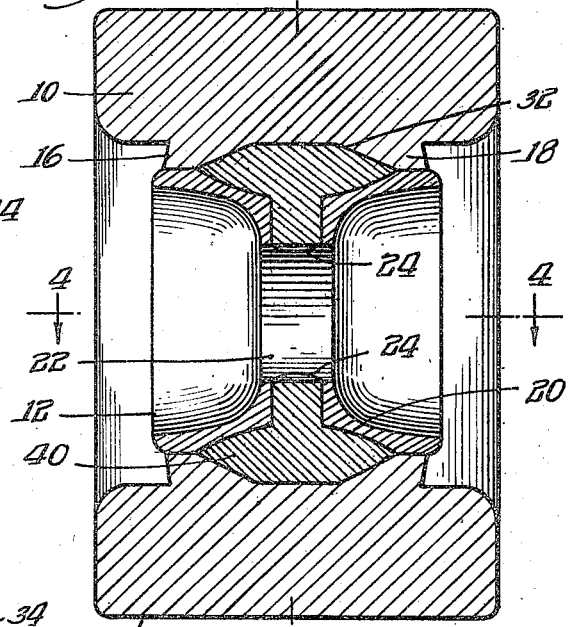
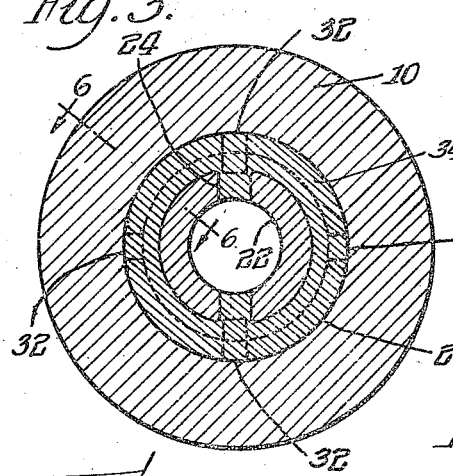
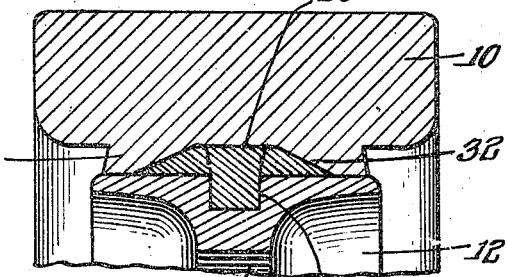
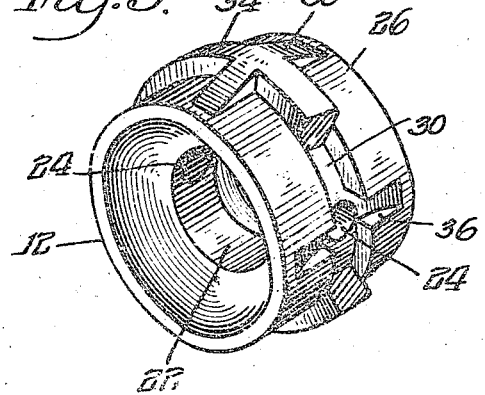
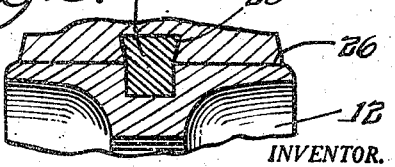
INVENTOR.
Robert R. Ware Jr.
BY
Moore, Olson & Trexler
attys.

Patented July 29, 1947

2,424,784

UNITED STATES PATENT OFFICE 2,424,784

WHEEL STRUCTURE

Robert R. Ware, Jr., Chicago, Ill., assignor to Chicago Roller Skate Company, Chicago, Ill., a corporation of Arizona Application June 4, 1945, Serial No. 597,514

6 Claims. (Cl. 301—5.7)

The present invention relates to a wheel structure, and more particularly to a roller or wheel of the type employed in roller skates and the like.

The present invention contemplates the provision of a roller skate wheel or roller having a tread portion formed of a non-metallic material such as wood, fiber, or plastic, in combination with a central bushing of hard material such as metal adapted to provide the necessary bearing surface.

Wheels or rollers of wood or similar relatively soft material are employed in relationships where metallic treads are unsuitable as is the case where skates are employed on rinks having wood or other relatively destructible surfaces. As distinguished from wheels wherein the several parts are of metal, structures comprising rollers or wheels having treads of wood or other fibrous material combined with metallic bushings exhibit a special problem in their permanent assembly. As for example the tread portions tend to shrink or expand greatly and to warp under the influence of changing moisture conditions in the atmosphere. It also will be apparent that various other conditions may cause such tread portions of wood to be deformed relative to the metal bushing.

In the relatively severe service normally encountered in the use of a roller skate together with the aforementioned atmospheric influences, the bushing and tread must at all times be rigidly interlocked since the merest movement of the parts ultimately will result in the complete loosening thereof.

Heretofore it has been suggested that to prevent axial movement of the tread relative to the bearing or bushing, that an interlock be formed by an interlocking case metal ring engaging both the bearing or bushing and the tread. While the bushing may otherwise be formed or constructed as to prevent rotation of the bushing relative to the tread, such constructions are relatively expensive since obviously it is more economical to fabricate and assemble parts which have a generally cylindrical contour.

Accordingly it would be desirable to provide in the assembly a tread and a bushing in a roller or wheel for a roller skate cooperating parts having generally cylindrical surfaces and yet provide an interlocking arrangement whereby rotation of the cylindrical surfaces relative to each other is prevented.

It, therefore, is an object of the present invention to obviate the above mentioned difficulty and to provide a roller wherein the parts are interlocked to prevent relative rotational displacement.

Another object of the present invention is to provide a new and improved roller of the type mentioned wherein the central bushing is positively or rigidly joined to the tread to prevent relative separation under the influence of changes due to atmospheric conditions or strains normally encountered during use.

A still further object of the present invention is to provide a roller skate wheel or roller having a tread of non-metallic material and a bushing of metal which are rigidly and permanently interlocked against radial or rotational displacement by the use of a unitary means.

Other and further objects of the present invention will become apparent from the following description taken in connection with the accompanying drawing wherein Figure 1 is a perspective view of a roller constructed in accordance with the present invention;

Figure 2 is a cross sectional view of the roller shown in Figure 1 as seen in the direction of the arrows along the line 2—2;

Figure 3 is a cross sectional view as seen in the direction of the arrows along the line 3—3 of Figure 2;

Figure 4 is a partial cross sectional view as seen in the direction of the arrows along the line 4—4 of Figure 2;

Figure 5 is a perspective view of the metal bearing and the cast interlock ring as it would appear if, subsequent to assembling, the tread had been removed; and Figure 6 is a partial cross sectional view of the structure seen in the direction of the arrows along the line 6—6 of Figure 3.

Referring more particularly to Figures 1 to 5 of the drawing, there is shown a roller or roller skate wheel having a body or tread portion 10 and a central bushing 12. The tread or body portion 10 of the wheel may be formed of wood such as relatively hard wear-resistant maple, although obviously other materials generally referred to as being non-metallic such as fibrous material or plastic may be used.

The body portion 10 has an outer annular peripheral surface 14 which normally contacts the floor when in service as a part of a roller skate. Each side of the wooden body of the roller is angularly cut away as at 16 to provide a central web section or bushing supporting portion 18.

The bushing 12 is arranged to cooperate with an axle or shaft for rotatably supporting the roller with respect to a body of a roller skate. To this end the bushing 12 has oppositely curved surfaces 20 constituting ball races or cups which serve to receive and retain suitable metallic ball bearings. Preferably these curved surfaces 20 are hardened. It will be understood from the above disclosure that the shaft or axle of the skate will be so constructed as to cooperate in a well-known manner with the bushing 12 to provide a complete ball bearing support for the wheel.

The oppositely curved surfaces 20 terminate interiorly of the bushing in a flat annular surface 22. Within this flat annular surface 22 a plurality of apertures 24 or cross drilled holes are formed for a purpose subsequently to become apparent.

From the drawing it will be seen that the inner web portion 18 is provided with a cylindrical aperture to receive the outer cylindrical surface 26 of the bearing 12. Midway between the outer surfaces 16 of the web 18 the roller body 10 is provided with an annular recess 28 which preferably has inwardly inclined walls so as to form a dove tail or keystone cross sectional shape. The bushing 12 is provided with a cooperating annular recess 30 having a width substantially equal to the narrowest width of the annular recess 28 in the body 10. In addition to the annular recess or groove 28 the wood body 10 is provided with a plurality of generally rectangular transversely arranged recesses which for example may be two or four in number arranged diametrically opposite each other as shown in the cross sectional view of Figure 3. It further may be desirable to position at least two of these recesses 32 so as to be at right angles to the holes or apertures 24 in the bearing 12.

The bushing 12 is provided with a plurality of generally rectangular cross sectional transversely arranged recesses 36. In the embodiment shown in the drawing, two such recesses 36 have been shown positioned transversely of the groove 30 opposite the apertures or holes 24. Obviously of course a greater number of such transversely arranged slots 36 may be employed.

After the bushing 12 has been inserted into the body 10 with the recesses 28 and 30 in substantial alignment, a casting metal is forced into the openings 24 in the bearing 12. This casting metal is preferably of some relatively low melting point metal such as lead and various alloys thereof which may be poured at sufficiently low temperature so that they will not adversely affect the materials contacted thereby. With the wood body 10 having four recesses 32 and the bushing 12 having two recesses 36, the recesses 36 are preferably aligned with two of the recesses 32. The casting metal therefore will form an interlocking ring 34 as may be seen particularly from Figure 5, which has transversely extending protuberances 38 shown in cross section in Figure 4, and transversely extending protuberances 40 shown in cross section in Figure 2. Thus the ring 34 is provided with transversely extending portions of greater dimensions than that of the ring which are so arranged as to prevent relative rotation between the bushing 12 and the wood body 10. The ring 34 which extends into both the body 10 and the bushing 12 prevents any axial movement between these parts. The ring 34 is dove-tailed into the channel or recess 28 because of the converging sides of that channel.

It is thought to be apparent from the foregoing that the present roller may be assembled by first forming in the body portion 10 a cylindrical opening in the web 18 and then forcing the bushing 12 securely therein until the channels 28 and 30 are in alignment. The molten casting metal is then applied to one of the apertures 24 in the bearing 12 through the agency of a tube or any other suitable feeding means and caused to flow through the internal passage formed by the channels 28 and 30 and the recesses 32 until the passages are completely full of molten metal and the excess of metal has been caused to flow through the other aperture 24'.

After the metal has solidified, any extending portions protruding from the apertures 24 may be cut off in the plane of the inner annular surface. It further will be appreciated that the recess 28 may be formed in any suitable manner and that the oppositely arranged recesses 32 may be formed by a suitable tool such as a burr or milling cutter suitable for operation within the space provided in the central aperture of the body 10.

The arrangement shown and described provides a relatively simple, effective, and inexpensive means for securing together the parts of a roller or wheel for a roller skate. Separation of the parts due to dimensional change, particularly of the outer body 10, no longer occurs because of the fact that the radial ring 34 interlocks with the annular body portion 10 and retains it fixed against the cylindrical surface 26 of the inner bearing member 12. The ring 34 is retained in the channel by the integral annular structure within the groove 30, the transversely extending portions 38 and 40, and also the integral radial portions extending inwardly through the apertures 24. Thus these integral portions within the apertures 24 cooperate to lock the ring 34 in the groove or channel 30 of the bushing 12 against relative rotational displacement and accordingly cooperate with the protuberances 38 and 40 to retain the tread portion 10 in relatively fixed rotation in respect to the bushing 12.

While the various stresses and vibrational forces to which the rollers are subjected in use are great, in accordance with the present invention there is substantially eliminated any possibility of wooden rollers becoming relatively loose on their central bushings. Furthermore the roller tread surface is maintained continuous and free from apertures and insertions which otherwise might be used to secure the inner bushing 12 against rotational displacement relative to the tread.

While for the purpose of illustrating and describing the present invention, it has been convenient to specify certain materials and to show physical embodiments, it is to be understood that these are not to be considered as limitations since obviously such modifications and variations in the materials and in the embodiments employed may be made as may be commensurate with the spirit and scope of the invention set forth in the following claims.

This invention is hereby claimed as follows:

1. A wheel comprising a body portion of a material subject to dimensional changes, a central metal bushing for said body portion, and means for securing the body portion and the bushing together against axial and rotational displacement comprising an annular ring of cast material extending into said bushing and said body portion and having at least one integral portion projecting generally radially through said bushing and at least one portion of greater dimensions extending transversely into said body portion.

2. The combination comprising a body portion of a material readily subject to dimensional changes, a central metal bushing for said body portion, and means for securing the bushing and body portion together against axial and rotational displacement comprising an annular ring of cast metal engaging into said bushing and body portion, said annular ring of cast material having an integral portion projecting generally radially through said bushing and spaced apart increased dimensional portions having quadrangular cross-sections for precluding rotation of the ring relative to said body portion.

3. The combination comprising a wheel tread portion of wood or the like, a central bushing of metal, and means to secure the tread portion and the bushing together in immovable relation comprising an annular channel formed on the outer surface of the bushing, a second annular channel formed on the interior surface of said tread portion, said latter channel having inwardly converging side walls, said latter channel having spaced apart transverse keyway recesses of greater dimensions than said channel, said bushing having a radially disposed passage extending inwardly from said first named channel, and an integral body of cast metal engaging both said channels, said radially disposed passage and said transverse keyway recesses in said tread portion.

4. A roller skate wheel comprising a wood tread, a central generally annular bushing adapted to receive a shaft or axle, means for securing the bushing and tread portion together comprising opposed channels formed in the bushing and tread portion, said channel in said tread portion having inwardly converging side walls, said bushing having a channel extending radially inwardly from the channel thereof, said channel in said tread portion being provided with spaced apart enlargements, and a cast metal member engaged within said channels and having dove-tailed engagement with said body portion, said cast metal extending into said enlargements, and into said channel extending radially inwardly in said bushing.

5. The combination comprising a wheel tread portion of wood or the like, a central bushing of metal, and means to secure the tread portion and the bushing together in immovable relation comprising an annular channel formed on the outer surface of the bushing, a plurality of oppositely arranged transversely extending recesses connecting with said annular channel in said bushing, at least one radially disposed passage extending inwardly in said bushing from said channel at the point of one of said transversely arranged recesses, a second annular channel formed on the interior surface of said tread portion, said latter channel having inwardly converging side walls, said latter channel having a plurality of oppositely arranged spaced apart transversely extending recesses, and an integral body of cast metal engaging both said channels, said radially disposed passage in said bushing, and said transversely arranged recesses in said bushing and said wheel tread portion.

6. A roller skate wheel comprising a wood tread, a central annular metal bushing adapted to receive a shaft, and means for securing the bushing and tread portion together in immovable relation comprising opposed annular channels formed in the bushing and tread portion, said channel and said tread portion having inwardly converging side walls, said bushing having a pair of oppositely arranged passages extending radially inwardly from the annular channel thereof, said bushing having adjacent said radially arranged channels transversely extending recesses, said channel in said tread portion being provided with a plurality of pairs of spaced apart transversely arranged recesses, certain of said recesses being arranged in alignment with the recesses in said bushing, and a cast metal member within said radially arranged passages, said opposed annular channels, and said transversely arranged recesses.

ROBERT R. WARE, Jr.

REFERENCES CITED

The following references are of record in the file of this patent:

UNITED STATES PATENTS

| Number | Name | Date |
|---|---|---|
| 1,751,795 | Dekome | Mar. 25, 1930 |
| 1,576,924 | Malloy | Mar. 16, 1926 |
| 1,795,821 | Baldwin | Mar. 10, 1931 |
| 2,241,684 | Ware | May 13, 1941 |